(12) United States Patent
Hawley, III (10) Patent No.: US 10,935,304 B1
(45) Date of Patent: Mar. 2, 2021

(54) ADJUSTABLE WATER COLLECTION PAN FOR APPLIANCES

(71) Applicant: Charles B. Hawley, III, Oak Island, NC (US)

(72) Inventor: Charles B. Hawley, III, Oak Island, NC (US)

( * ) Notice: Subject to any disclaimer, the term of this patent is extended or adjusted under 35 U.S.C. 154(b) by 75 days.

(21) Appl. No.: 15/969,932

(22) Filed: May 3, 2018

Related U.S. Application Data (63) Continuation-in-part of application No. 15/086,589, filed on Mar. 31, 2016, now abandoned.

(51) Int. Cl.
*F25D 21/14* (2006.01)
*F16N 31/00* (2006.01)
*B65D 90/24* (2006.01)

(52) U.S. Cl.
CPC ............ *F25D 21/14* (2013.01); *B65D 90/24* (2013.01); *F16N 31/002* (2013.01); *F16N 31/006* (2013.01); *F25D 2321/144* (2013.01); *F25D 2321/1442* (2013.01)

(58) Field of Classification Search
CPC ....... F25D 2321/1442; F25D 2321/144; F25D 21/14; F25D 2321/146; F16N 31/006; F16N 31/002; B65D 25/38; B65D 90/24; F24F 13/222; F24F 1/36
USPC ............. 220/571–573, 590.03; 137/312, 313
See application file for complete search history.

(56) References Cited

U.S. PATENT DOCUMENTS

| 1,034,340 | A | | 7/1912 | Bishop | |
|---|---|---|---|---|---|
| 2,948,624 | A | * | 8/1960 | Watson | B65D 21/08 426/111 |
| 3,304,950 | A | * | 2/1967 | Hubert | D06F 39/125 137/312 |
| 4,889,155 | A | | 12/1989 | Trotter, Sr. | |
| 5,016,772 | A | * | 5/1991 | Wilk | B65D 21/086 220/495.01 |
| D337,154 | S | | 7/1993 | Simpson | |
| 5,429,236 | A | * | 7/1995 | Evans | B65D 19/0016 108/55.1 |
| 5,437,303 | A | * | 8/1995 | Johnson | D06F 39/081 137/312 |
| 5,452,739 | A | * | 9/1995 | Mustee | A47L 15/4212 137/312 |
| 5,478,625 | A | * | 12/1995 | Wright | F16N 31/006 180/69.1 |
| 5,598,594 | A | * | 2/1997 | Milliken | B08B 17/00 14/69.5 |
| D388,566 | S | | 12/1997 | Reid et al. | |
| 6,106,712 | A | * | 8/2000 | New | B01D 17/0208 210/241 |
| 6,120,876 | A | * | 9/2000 | Walton | F16N 31/006 180/69.1 |
| 6,718,788 | B1 | | 4/2004 | Shuck | |

(Continued)

*Primary Examiner* — James N Smalley
*Assistant Examiner* — Jennifer Castriotta
(74) *Attorney, Agent, or Firm* — Harpman + Harpman (57) ABSTRACT

An adjustable liquid containment device for use with refrigerators to prevent overflow and damage to flooring. The containment device allows for appliance elevation within an integral support and water collection pan. The detachable loading ramps provide for smoothly rolling the appliance up onto the integrated independent elevated level support surfaces within the water retainment pan. The containment device is telescopically adjustable to accommodate different size appliances.

2 Claims, 11 Drawing Sheets

(56) References Cited

U.S. PATENT DOCUMENTS

2010/0243661 A1* 9/2010 Upham ............... A47L 15/4212
                                                    220/571
2014/0248085 A1* 9/2014 Zajicek .................. B09B 1/004
                                                    405/129.75

* cited by examiner

ADJUSTABLE WATER COLLECTION PAN FOR APPLIANCES

This is a Continuation in Part patent application of U.S. application Ser. No. 15/086,589, filed Mar. 31, 2016.

BACKGROUND OF THE INVENTION

1. Technical Field

This invention relates to drain and water containment safety pans placed under appliances that generate water output from defrosting and condensation and the like such as refrigerators.

2. Description of Prior Art

Prior art devices of this type have been heretofore directed to water overflow safety trays or pans that the appliance is placed. Such overflow safety trays typically have a drain line connected thereto extending to a drain assuring that no water damage will occur if the water is released from the appliance.

Examples of such safety drain pans can be seen in U.S. Pat. Nos. 1,034,340, 4,889,155 and 6,718,788. Additionally, design U.S. Pat. Nos. D337,154 and D388,566.

U.S. Pat. No. 1,034,340 discloses a drip pan under an ice box which is connected to a remote drain by a drain line extending there between.

U.S. Pat. No. 4,889,155 discloses a water collection mat for dishwashers having a flexible base with an upstanding perimeter rim and an inner surface incline towards a center opening therein connected to a flexible drain tube.

U.S. Pat. No. 6,718,788 claims a method for producing a drain pan in which an appliance can be placed.

Design U.S. Pat. No. D337,154 discloses a design for a drain tray having an inclined interior to collect water to a central drain outlet.

Design U.S. Pat. No. D388,566 shows a water catcher for an appliance having a water tray which is elevated on multiple adjustable legs.

SUMMARY OF THE INVENTION

A water collection and containment pan for appliances, specifically refrigerators that elevates the appliance within a water retention pan having upstanding sidewalls with an inclined interior base surface. Elevated elongated appliance receiving platforms extend from the interior surface of the pan providing support for an appliance positioned thereon in an elevated position. Auxiliary access loading ramps are provided to allow for rolling the appliance up and onto the platforms within the containment pan.

DETAILED DESCRIPTION OF THE INVENTION

A water containment pan 10 can be seen in FIG. 1 of the drawings having a pan portion 11 and multiple ramps 12 and 13 removably attached thereto as will be described in greater detail hereinafter.

The pan portion 11 has oppositely disposed front and rear walls 14 and 15 with interconnecting spaced parallel sidewalls 16 and 17. The wall pairs 14 and 15 and 16 and 17 are integral with a continuous interior surface 18 which has a dual incline pitch orientation extending from the front wall 14 downwardly to the rear wall 15 and correspondingly from the respective oppositely disposed sidewalls 16 and 17 inwardly towards a central area defined by a broken pitch line PL shown for representation purposes only.

An outlet drain 19 is formed within the interior surface 18 at a cross translateral point of the hereinbefore described dual pitch interior surface.

Figure 1:
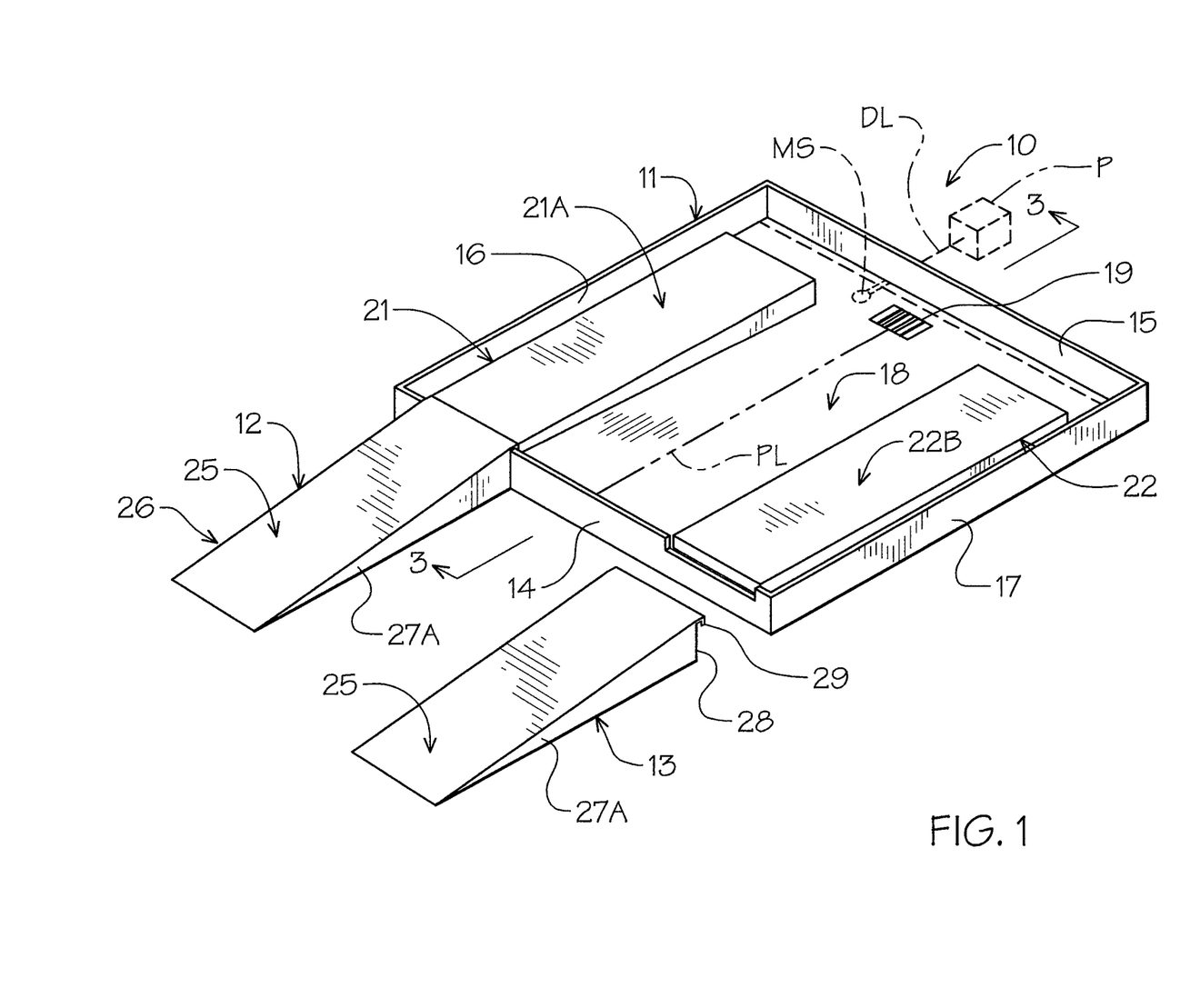
FIG. 1 is a perspective view of the collection pan of the invention with access ramps being positioned for use.

The drain 19 may be static having a gravity feed channel 20 extending outwardly therefrom through the rear wall 15 or active by having inclusion of an attached powered transfer pump P illustrated in dotted lines for an alternate illustration purpose only in FIG. 1 of the drawings.

A pair of spaced parallel elongated elevated platforms 21 and 22 extend integrally from the dual pitch interior surface 18 extending from adjacent the front wall 14 and in spaced relation to the respective rear wall 15.

Figure 2:
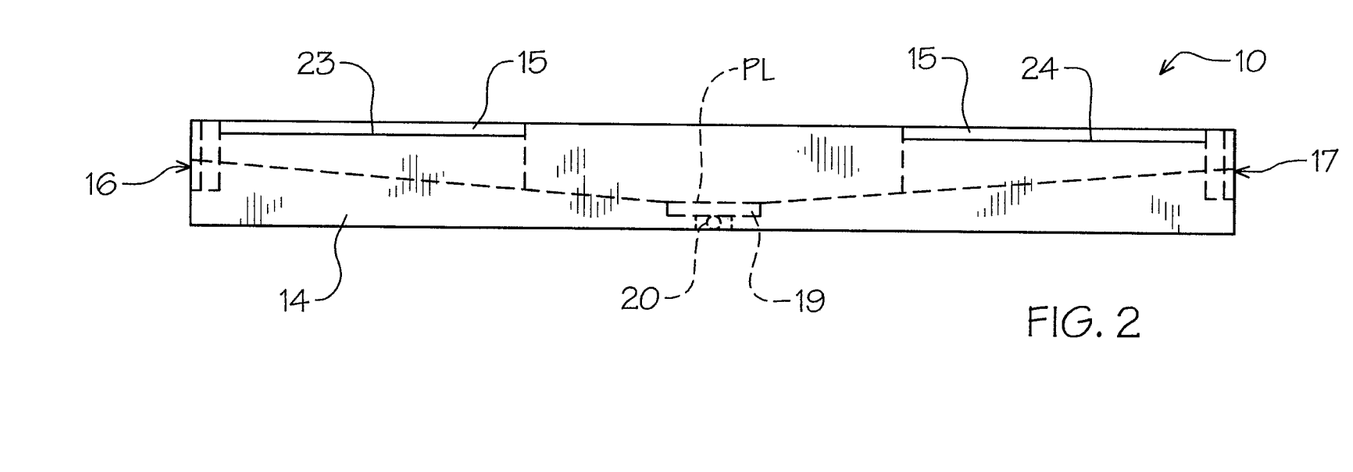
FIG. 2 is a front elevational view of the retainment support pan.

Referring now to FIGS. 1 and 2 of the drawings, the front wall 14 has a pair of spaced elongated notches 23 and 24 therein which will provide for respective access ramps 12 and 13 selective engagement registration and stabilization thereto for loading and unloading the wheeled appliance thereon as will be described in greater detail hereinafter.

Figure 3:
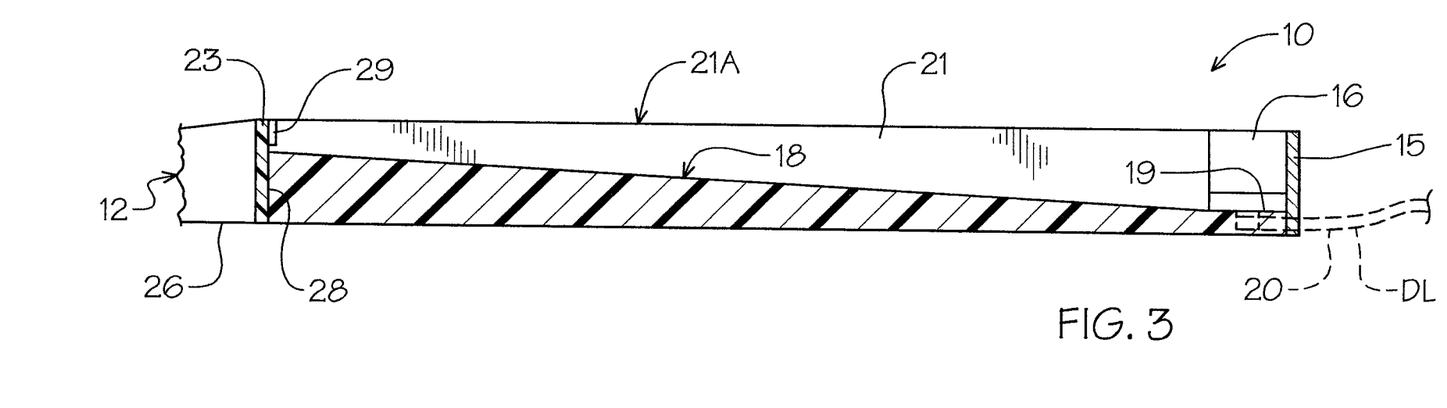
FIG. 3 is a section on lines 3-3 of FIG. 1.
Figure 4:
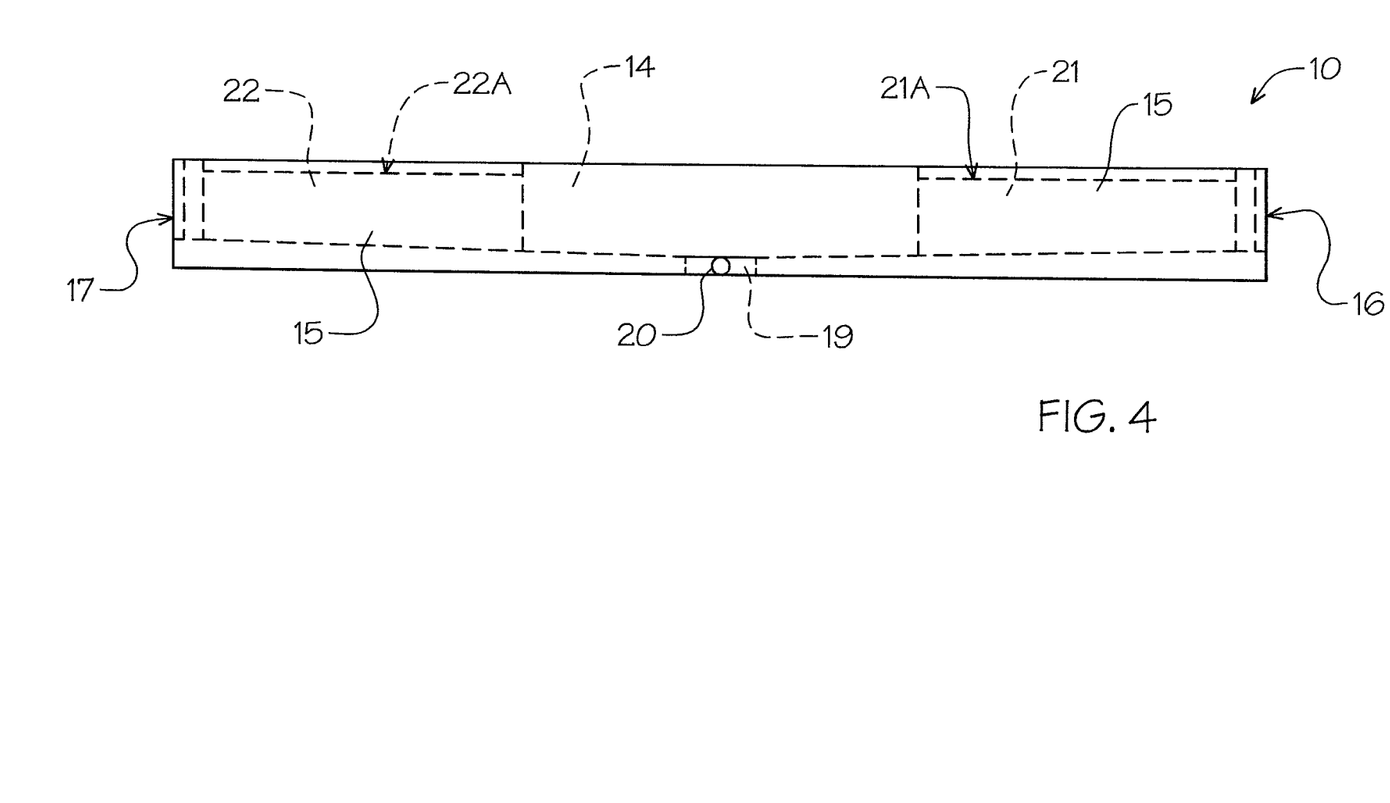
FIG. 4 is a rear elevational view of the retainment support pan.
Figure 5:
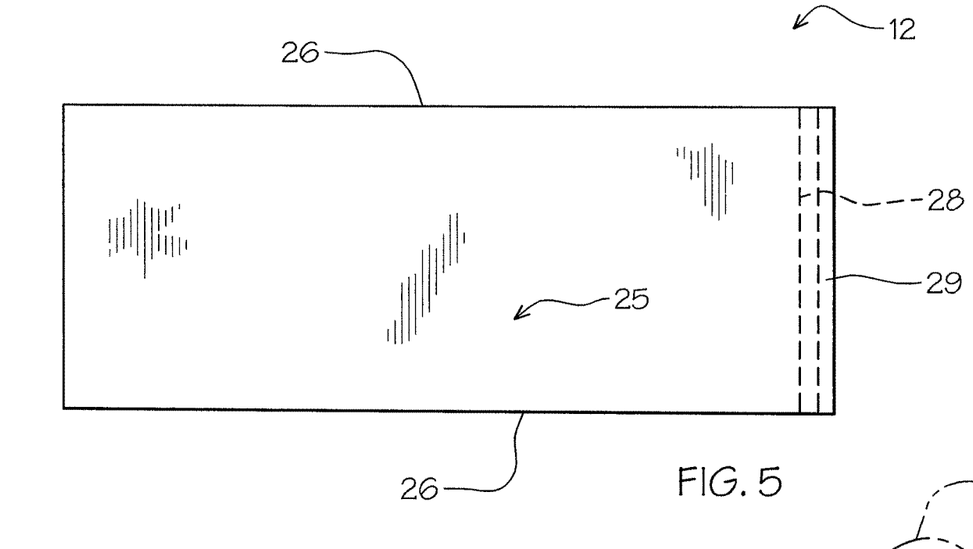
FIG. 5 is a top plan view of one of the access ramps.

The platforms 21 and 22 orientation within the pan portion 11 and corresponding dual side to side and front to back internal interior surface pitch can clearly be seen in FIGS. 2 and 3 of the drawings assuring that any liquid leakage that is generated from the appliance such as will occur during normal operation inclusive of defrosting or cooling as would occur in a refrigerator will safely be caught and retained there within.

The appliance receiving platforms 21 and 22 have respective flat level upper surfaces 21A and 22B which are the same height as that of the respective perimeter walls 14-17 and are of a transverse width and parallel spacing to accommodate a variety of different appliance support wheeled configurations.

Figure 6:
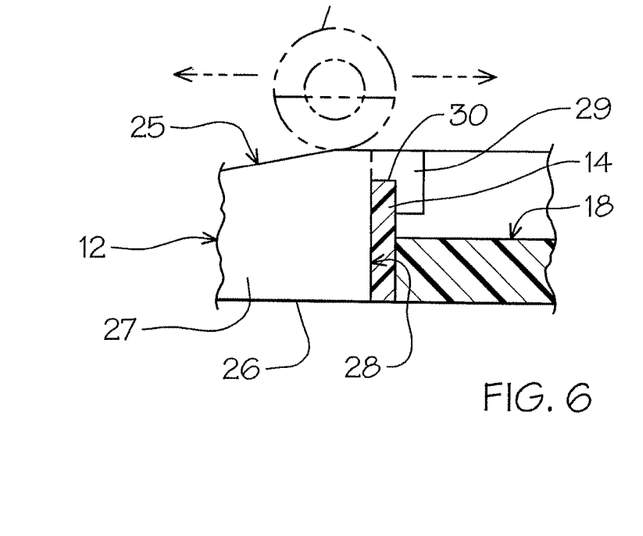
FIG. 6 is a partial sectional view on lines 6-6 of FIG. 5.

Referring now to FIGS. 1, 3, 5 and 6 of the drawings the access ramps 12 and 13 can be seen having an inclined tapered upper surface 25, an oppositely disposed flat ground engagement bottom 26 with respective vertical sides 27A and end 28. The end side 28 has a wall engagement flange 29 extending in offset relation thereto forming a wall notch engagement channel 30 therein so as to be registerably engaged within and over the respective front wall notches 23 and 24, as best seen in FIG. 6 of the drawings.

In use, the appliance (refrigerator) indicated by wheel W is moved temporarily and the pan portion 11 is positioned in its place. A drain line DL shown in broken lines may be attached thereto, as noted. Additionally, an optional moisture sensor MS shown in broken lines can be placed within the pan portion to indicate the presence of moisture, if needed, in specific application purposes.

Each of the access ramps 12 and 13 are fitted over the corresponding aligned notches 23 and 24 temporarily securing them to the pan portion 11 forming a level abutting surface with the elevated platforms 21 and 22 respective flat upper surface 21A and 22A. This orientation of engagement of the respective ramps 12 and 13 over the front wall 14, notches 23 and 24 assures a smooth and barrier free pathway for the wheeled appliance (represented by the wheel W in broken lines) to be rolled up the respective ramp transition onto the upper surfaces of the platforms so as to be positioned.

Once positioned on the platforms 21 and 22, the ramps 12 and 13 are removed and stored for future use.

The appliance (refrigerator) indicated by wheel W is now safely positioned within the pan portion 11 providing a safe secure water containment pan 10 of the invention. The pan portion 11 and the respective identical access ramps 12 and 13 may be molded from synthetic resin or its equivalent and are to be of a structure sufficient in strength to support and maintain the elevated appliance in its position on the respective platforms.

Referring now to FIGS. 7-16 of the drawings, an alternate form of the invention can be seen as an expandable water containment pan 31. The expandable containment pan 31 has a first fixed pan portion 32 with oppositely disposed front and rear walls 33 and 34 and an interconnecting sidewall 35. An integral continuous interior surface 36 extends from the respective walls 33, 34 and 35 and has a primary inclined pitch extending from front wall 33 to rear wall 34.

A fluid drain 37 and a drain channel 37A are formed in the interior surface 36 providing drainage from the containment pan 31.

An elevated appliance support platform 38 is formed in and extends from below the interior surface 36 on a tapered base 36A of the first fixed pan portion 32. A platform support surface 38A thereof is level and in co-planar relation to the front wall 33.

A second movable pan portion 39 has front and rear walls 40 and 41 and interconnecting sidewall 42 with a corresponding integral single pitch interior surface 43 from front wall 40 to rear wall 41. A secondary support platform 44 is formed in and extends upwardly from below the interior surface 43 adjacent and parallel with the sidewall 42.

The front walls 33 and 40 are of equal height in sliding engaged position to one another as seen in FIGS. 7-14 of the drawings for registration with a pair of independent removable access ramps 45 and 45A which are identical to the hereinbefore described access ramps 12 and 13 in the primary form of the invention. The first fixed and second movable pan portions 32 and 39, in use, are slidably disposed within one another with the front wall 40 engaged against the front wall 33 allowing for a sliding relation in a telescopically extensible manner. Correspondingly, the first and second pan portions 32 and 39 rear walls 34 and 41 are in sliding side by side relationship with one another allowing, as noted, the respective pan portions to be effectively expanded and/or contracted laterally, repositioning the spacing of the corresponding interior fixed support platforms 38 and 44 as shown in solid and broken lines in FIGS. 7 and 16 of the drawings.

Figure 7:
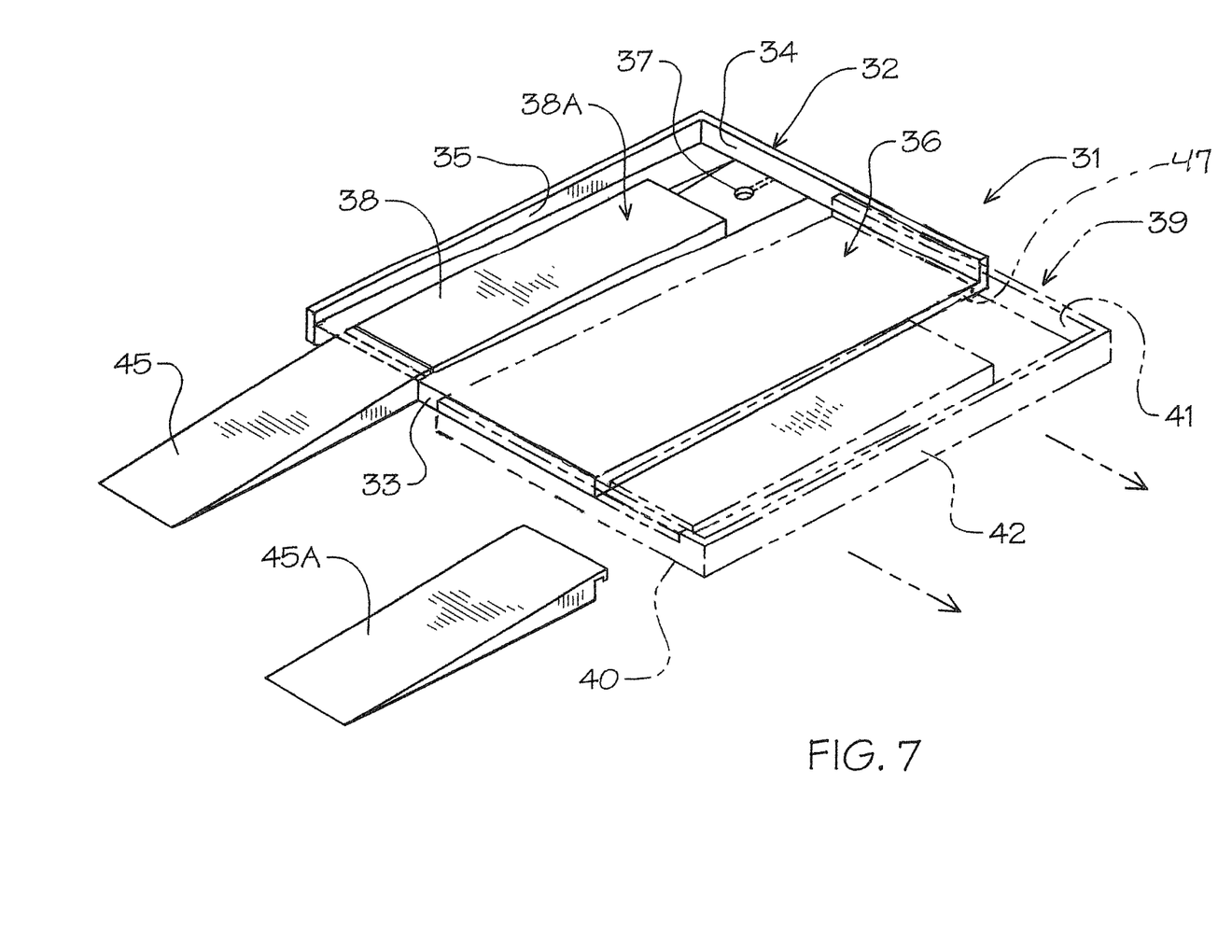
FIG. 7 is a perspective overlapping view of an alternate expandable collection pan of the invention with access ramps in solid and broken lines.
Figure 8:
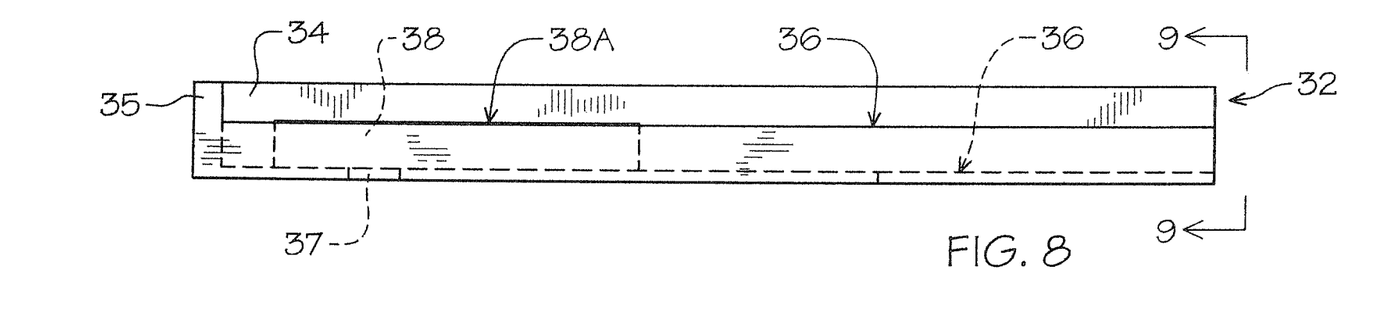
FIG. 8 is a front elevational view of fixed retainment support pan.
Figure 9:
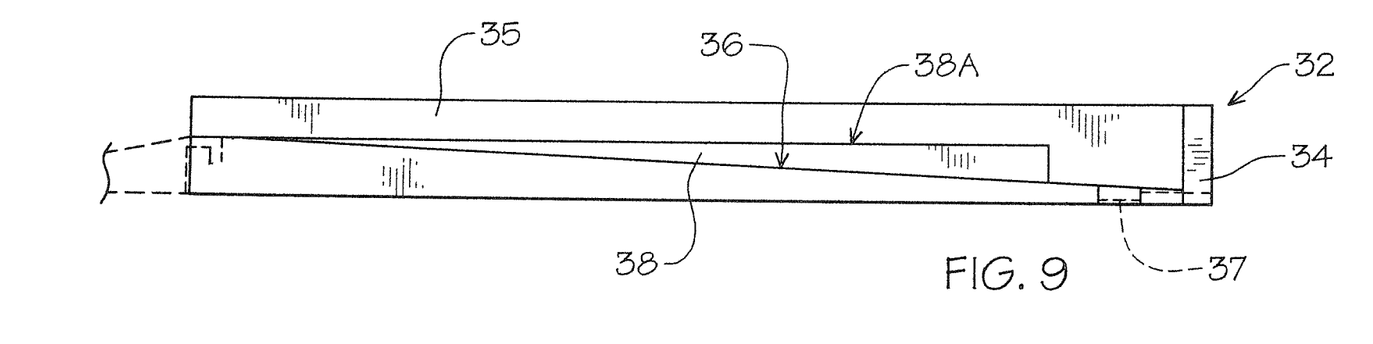
FIG. 9 is a side elevational view thereof on lines 9-9 of FIG. 8.
Figure 10:
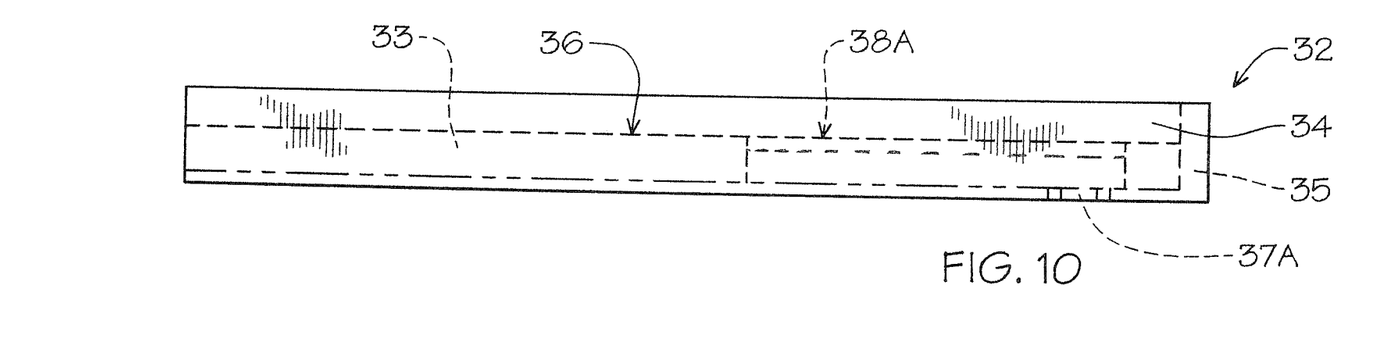
FIG. 10 is a rear elevational view thereof.
Figure 11:
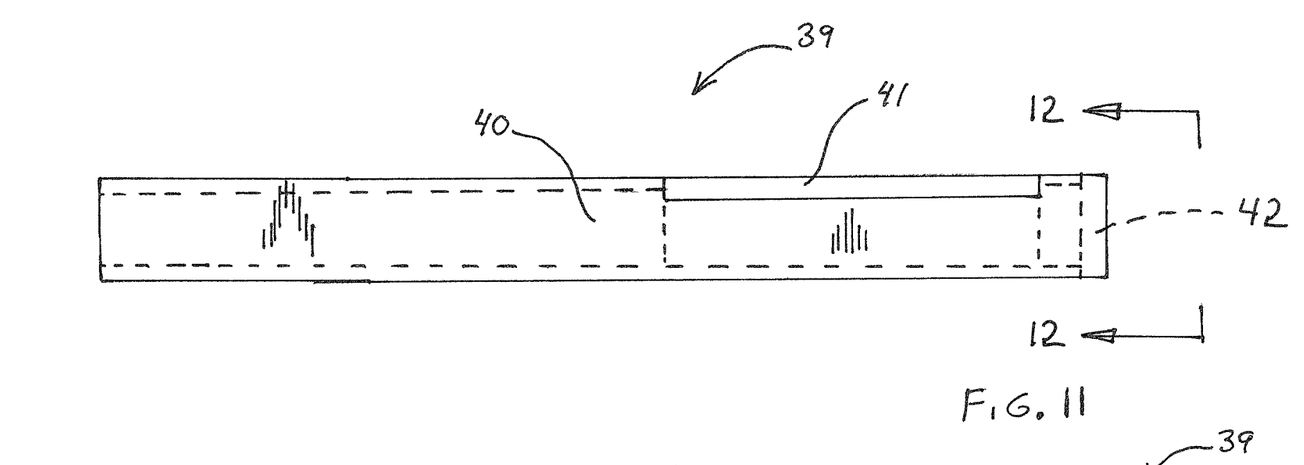
FIG. 11 is a front elevational view of the movable retainment support pan.
Figure 12:
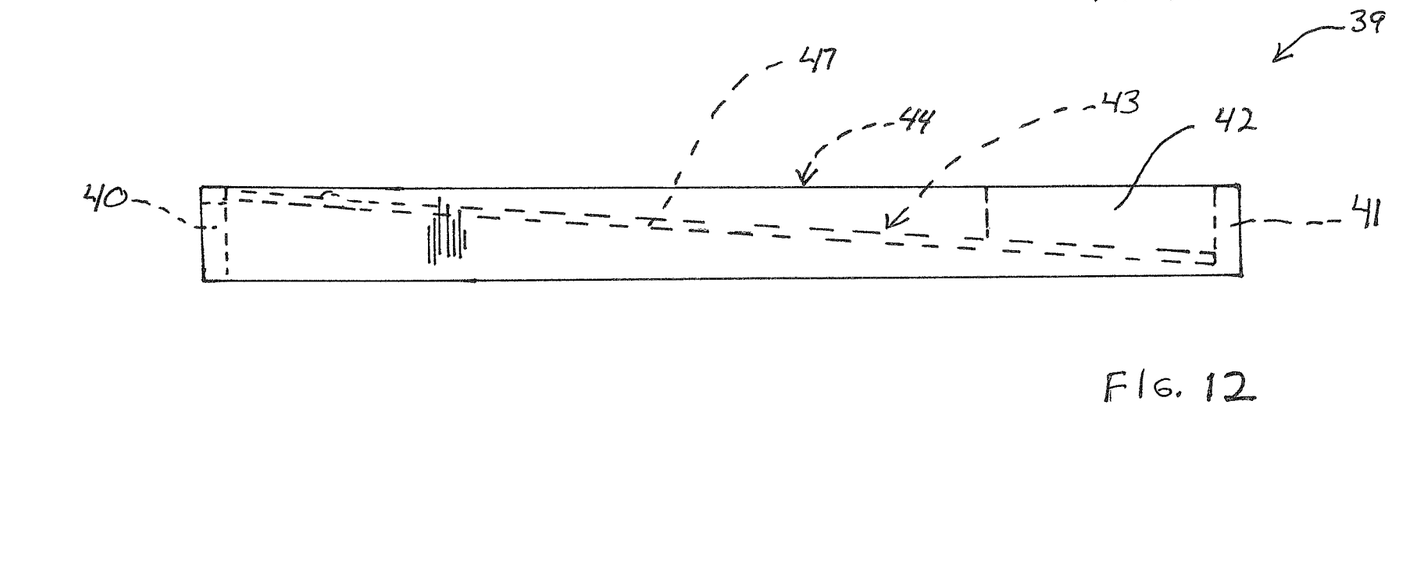
FIG. 12 is a side elevational view on lines 12-12 of FIG. 11.
Figure 13:
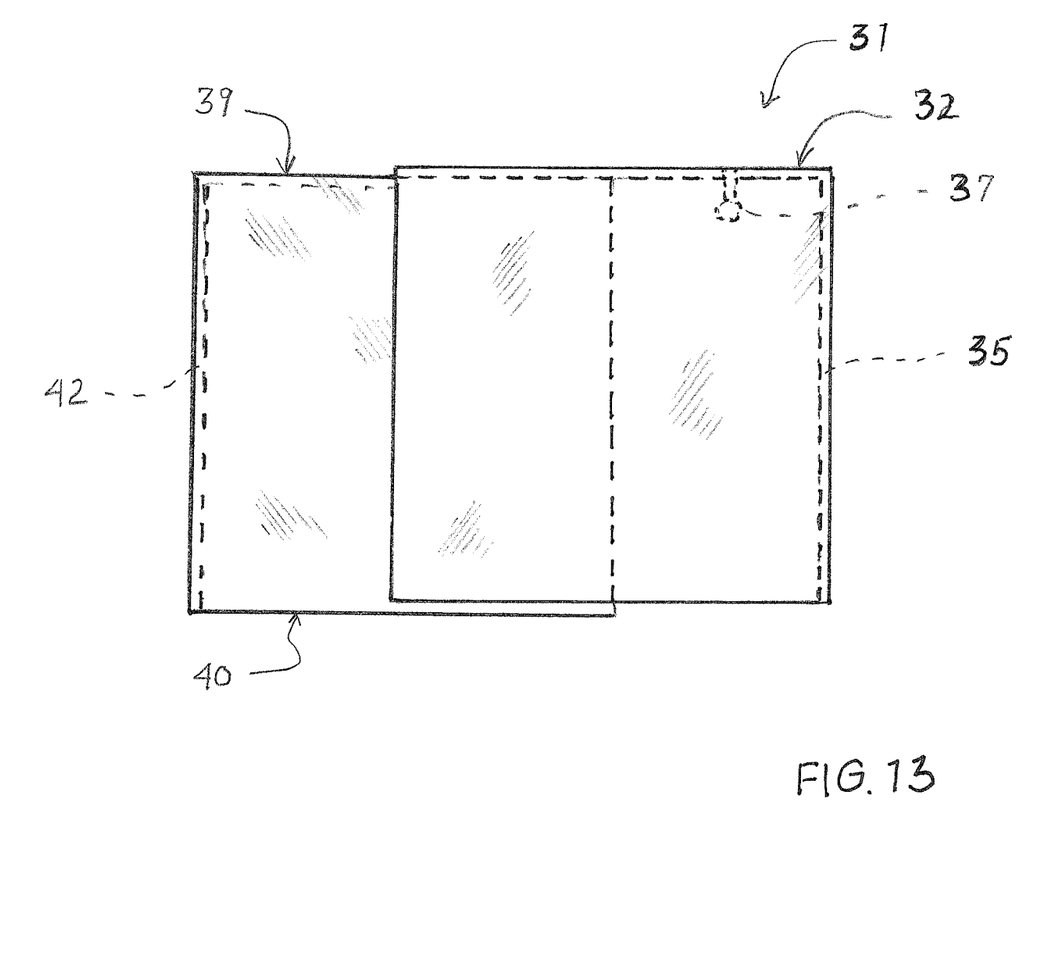
FIG. 13 is a bottom plan view with overlapping positions of the alternate expandable collection pan.
Figure 14:
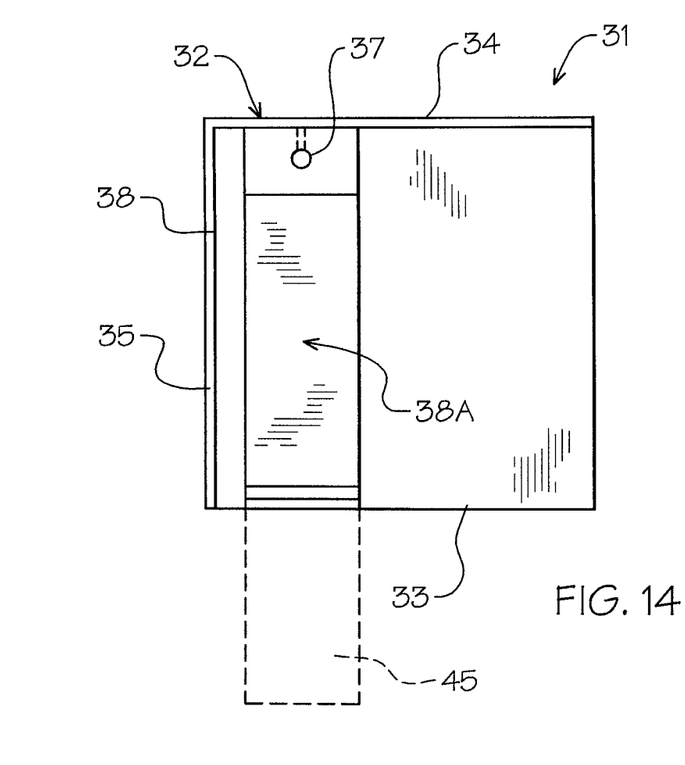
FIG. 14 is a top plan view of the fixed pan.
Figure 15:
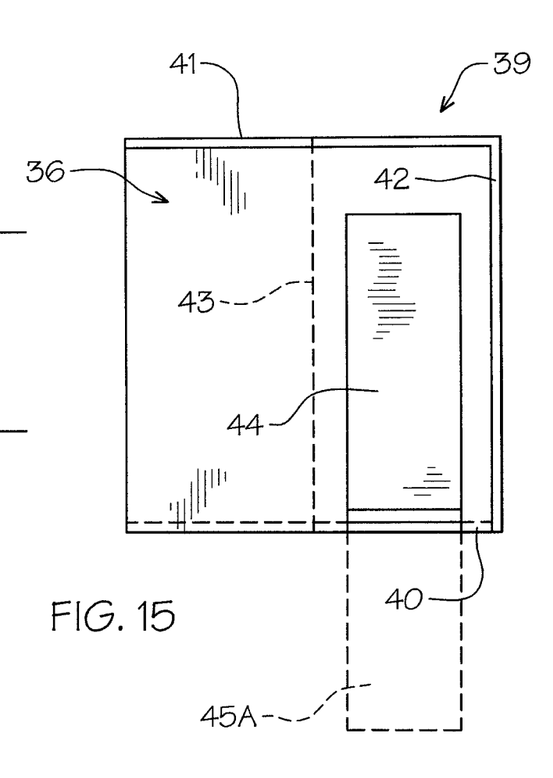
FIG. 15 is a top plan view of the movable pan.
Figure 16:
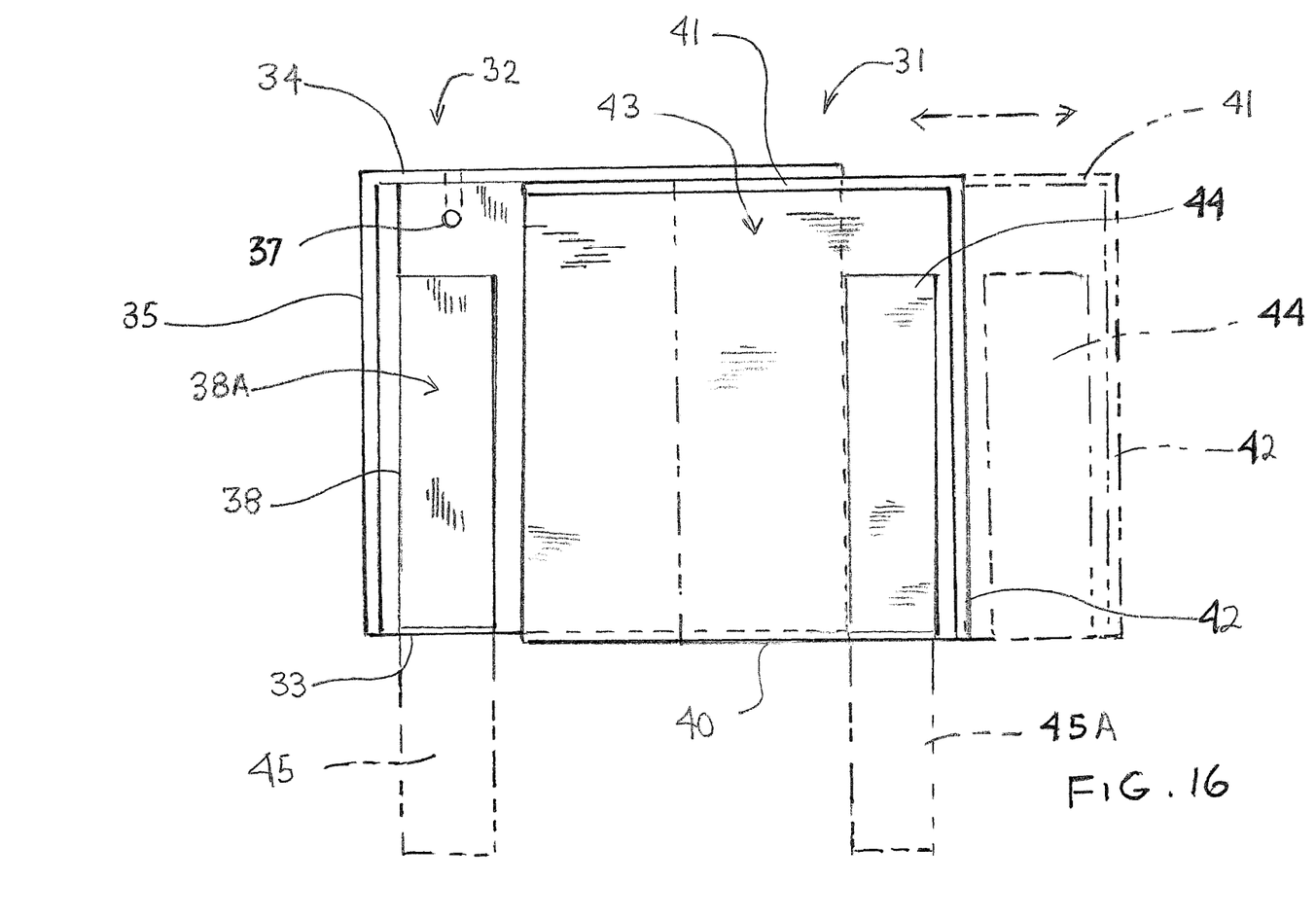
FIG. 16 is a top plan view of the closed and open overlapping view of both fixed movable pans in solid and broken lines.

Referring to FIGS. 11, 12 and 7 of the drawings, the second movable pan portion 39 has tapered support base, primarily under the interior surface forming a pan "stop" at 47 which will engage the tapered side edge E of the first fixed pan portion 32 when the respective pan portions 32 and 39 are slidably engaged together in their minimum "collapsed" position as seen in FIGS. 13 and 16 and in partial broken lines in FIG. 7 of the drawings.

Figure 17:
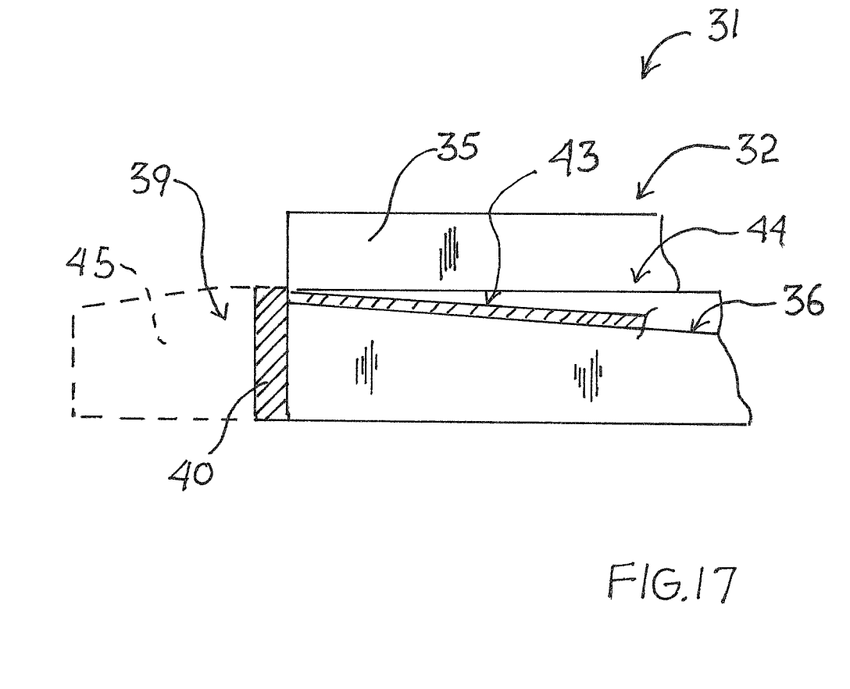
FIG. 17 is an enlarged partial and sectional view of pan portions with portions broken away.
Figure 18:
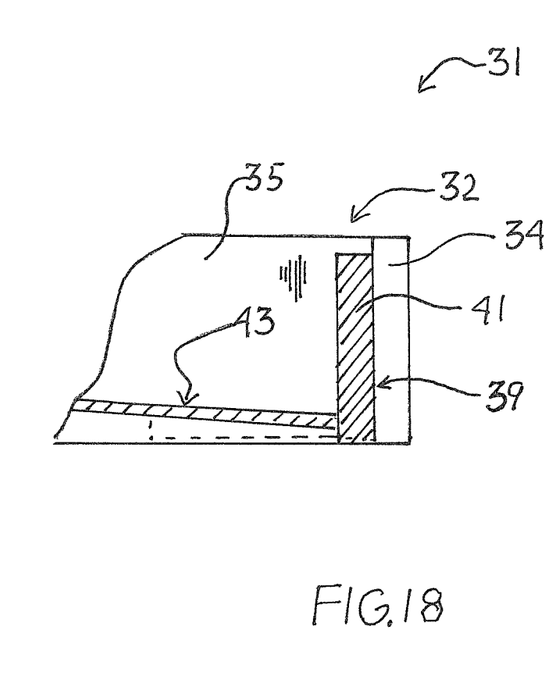
FIG. 18 is an enlarged partial end sectional view of the pan portions with portions broken away.

Referring to FIGS. 17 and 18 the interengagement overlapping relationship of the pan portions 32 and 39 can be seen where the continuous integral surface 43 of the movable pan portion 39 is illustrated as sliding over the corresponding interior surface 36 of the fixed pan portion 31 and is of a reduced thickness indicated by sectional lines thereon.

It will be evident that the alternate expandable water containment pan 31 will accommodate therefore a variety of different sized appliances (not shown) with access achieved by repositioning of the mobile detachable ramps 45 and 45A as previously described.

In operation, once the required pan and support platform spacing has been determined and the pan portions adjusted, the overlapping interior surfaces 36 and 43 thus unifying the expandable water containment pan 31 into a water tight collection configuration in its re-adjusted configuration.

It will thus be seen that a new and novel water collection pan for appliances has been illustrated and described and it will be apparent to those skilled in the art that various changes and modifications may be made thereto without departing from the spirit of the invention.

Therefore, I claim:

1. An adjustable liquid retainment and support pan for use with an appliance comprising, a first pan portion and a second pan portion, said first and second pan portions each having a respective inner recess surface an integral front wall, an upstanding rear wall and an interconnecting upstanding respective sidewall, said pan portions having upstanding appliance support platforms extending from within each of said respective pan portion's inner recess surfaces and are adjacent to and parallel with each of their respective side wall, said upstanding appliance support platforms each having a level solid continuous respective platform support surface in planar relation with a top edge of said respective integral front walls and wherein said pan portions inner recessed surfaces are pitched for the collection of liquid into a drain in said first pan portion inner recess surface adjacent said upstanding rear wall of said first pan portion, said second pan portion being slidably engaged over a portion of said first pan portion and, access ramp portions removably secured to said respective first and second pan portions in longitudinal alignment with said respective appliance support platforms.

2. The adjustable liquid retainment and support pan set forth in claim 1 wherein said drain within the inner recess surface of said first pan portion further comprises, said drain within said recess surface in communication with and extending to the exterior of said first pan portion.

* * * * *